US009203949B2

(12) United States Patent
Klassen et al.

(10) Patent No.: US 9,203,949 B2
(45) Date of Patent: *Dec. 1, 2015

(54) SYSTEM AND METHOD FOR INTEGRATING IMAGE UPLOAD OBJECTS WITH A MESSAGE LIST

(76) Inventors: Gerhard D. Klassen, Waterloo (CA); Terrill Dent, Waterloo (CA); Scotte Zinn, Waterloo (CA)

(*) Notice: Subject to any disclaimer, the term of this patent is extended or adjusted under 35 U.S.C. 154(b) by 0 days.

This patent is subject to a terminal disclaimer.

(21) Appl. No.: 13/083,791

(22) Filed: Apr. 11, 2011

(65) Prior Publication Data

US 2011/0276606 A1 Nov. 10, 2011

Related U.S. Application Data

(63) Continuation of application No. 11/754,796, filed on May 29, 2007, now Pat. No. 7,941,467.

(51) Int. Cl.
*G06F 17/30* (2006.01)
*H04M 1/725* (2006.01)

(52) U.S. Cl.
CPC ...... *H04M 1/72555* (2013.01); *G06F 17/30017* (2013.01); *G06F 17/30265* (2013.01); *G06F 17/30244* (2013.01); *G06F 17/30268* (2013.01); *H04M 2250/64* (2013.01)

(58) Field of Classification Search
CPC .................. G06F 17/30265; G06F 17/30268; G06F 3/0482; G06F 17/30017; G06F 17/30244
USPC .......................................................... 707/803
See application file for complete search history.

(56) References Cited

U.S. PATENT DOCUMENTS

| 7,639,943 | B1 | 12/2009 | Kalajan |
| 7,941,467 | B2 | 5/2011 | Klassen et al. |
| 2002/0087601 | A1* | 7/2002 | Anderson et al. ............. 707/515 |
| 2002/0184318 | A1* | 12/2002 | Pineau .......................... 709/206 |
| 2003/0030731 | A1 | 2/2003 | Colby |
| 2003/0160815 | A1* | 8/2003 | Muschetto .................... 345/733 |

(Continued)

FOREIGN PATENT DOCUMENTS

CN 1595401 A 3/2005
EP 0 845 894 6/1998

(Continued)

OTHER PUBLICATIONS http://www.snapfish.com/snapfish/release5192004.*

(Continued)

*Primary Examiner* — Tony Mahmoudi
*Assistant Examiner* — Merilyn Nguyen

(57) ABSTRACT

There is disclosed a system and method for integrating an image upload object with a message list. In an embodiment, the method comprises: creating an image upload object for each image to be uploaded; and displaying the image upload object in a message list such that the image upload object may be selected and opened as a message. In another embodiment, the method may further comprise associating with the image upload object at least one of a text description, a thumbnail of the image, a date, and a file link to the uploaded image. In another embodiment, an image upload object in the message list may be configured such that the image upload object may be forwarded to another user as a message, and the associated uploaded image may be accessed by the other user via the file link.

20 Claims, 10 Drawing Sheets

(56) References Cited

U.S. PATENT DOCUMENTS

| | | | |
|---|---|---|---|
| 2003/0222874 A1 | 12/2003 | Kong et al. | |
| 2004/0075691 A1 | 4/2004 | Moon | |
| 2004/0111415 A1* | 6/2004 | Scardino et al. | 707/10 |
| 2005/0102381 A1* | 5/2005 | Jiang et al. | 709/220 |
| 2005/0182798 A1 | 8/2005 | Todd et al. | |
| 2005/0210145 A1* | 9/2005 | Kim et al. | 709/231 |
| 2005/0266839 A1 | 12/2005 | Paul et al. | |
| 2007/0073937 A1* | 3/2007 | Feinberg et al. | 710/62 |
| 2007/0088786 A1* | 4/2007 | Hardy et al. | 709/206 |
| 2007/0226658 A1* | 9/2007 | Virk | 715/864 |
| 2008/0294532 A1* | 11/2008 | Osborne | 705/26 |
| 2008/0313011 A1 | 12/2008 | Rose et al. | |

FOREIGN PATENT DOCUMENTS

| | | |
|---|---|---|
| EP | 0845894 | 6/1998 |
| EP | 1 562 349 | 8/2005 |
| GB | 2 403 099 | 12/2004 |
| JP | 2002 163199 | 6/2002 |
| JP | 2002163199 | 6/2002 |
| JP | 2005 122280 | 5/2005 |
| JP | 2005122280 | 5/2005 |
| JP | 2005 222408 | 8/2005 |
| JP | 2005222408 | 8/2005 |

OTHER PUBLICATIONS

First Office Action, Chinese Patent Application No. 200810099977.8.
Forumpost, Posting Your Pictures of the Forum, Jan. 14, 2006, Forumpost, pp. 1-3.
Extended European Search Report, European Patent Application No. 07109090.
Risto Sarvas, et al., "MobShare: Controlled and Immediate Sharing of Mobile Images", Proceedings of the ACM International Conference on Multimedia, Oct. 10, 2004, pp. 724-731.
Extended European Search Report dated Jun. 15, 2012, EP12167871.8.
USPTO, US Office Action relating to U.S. Appl. No. 13/590,398, dated Nov. 22, 2013.
EP Office Action dated Apr. 16, 2013, EP12167871.8.
USPTO, US Final Office Action relating to U.S. Appl. No. 13/590,398 dated Mar. 20, 2014.
SNAPFISH press release dated May 19, 2004, http://snapfish.com/snapfish/release5192004.
CIPO, CA Office Action relating to U.S. Pat. No. 2,632,177 dated Mar. 4, 2014.
USPTO, US Office Action relating to U.S. Appl. No. 13/589,410 dated Dec. 23, 2013.
CIPO, CA Office Action relating to U.S. Pat. No. 2,632,177, dated Jan. 28, 2015.
CIPO, CA Office Action relating to Application No. 2,632,168, dated Aug. 3, 2015.

* cited by examiner

SYSTEM AND METHOD FOR INTEGRATING IMAGE UPLOAD OBJECTS WITH A MESSAGE LIST

CROSS-REFERENCE TO RELATED APPLICATIONS

The present application is a continuation of U.S. patent application Ser. No. 11/754,796 filed May 29, 2007 and issued as U.S. Pat. No. 7,941,467, the entire disclosure of which is incorporated herein by reference.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

FIELD OF THE INVENTION

The present invention relates generally to systems and methods for integrating image upload objects with a message list.

BACKGROUND

Recent advances with handheld wireless communication devices have resulted in the introduction of integrated cameras capable of capturing images at a resolution sufficient for many consumer applications. Once captured, the images may be stored in available memory on the communication device, and viewed on a display provided on the communication device. However, the available memory on the communication device may be limited, and a user may not be able to capture and store new images in the communication device without deleting images or other files already stored in memory. As well, while the user may enjoy the images on the communication device, the user may want to share the images with other users. However, there may be carrier network restrictions on transmission bandwidth. Also, if the images are to be shared, the ability to easily add descriptive information and location information about the images may be desirable.

What is needed is an improved system and method for integrating image upload objects with a message list.

DETAILED DESCRIPTION

As noted above, the present invention relates generally to systems and methods for integrating an image upload object with a message list.

Figure 1:
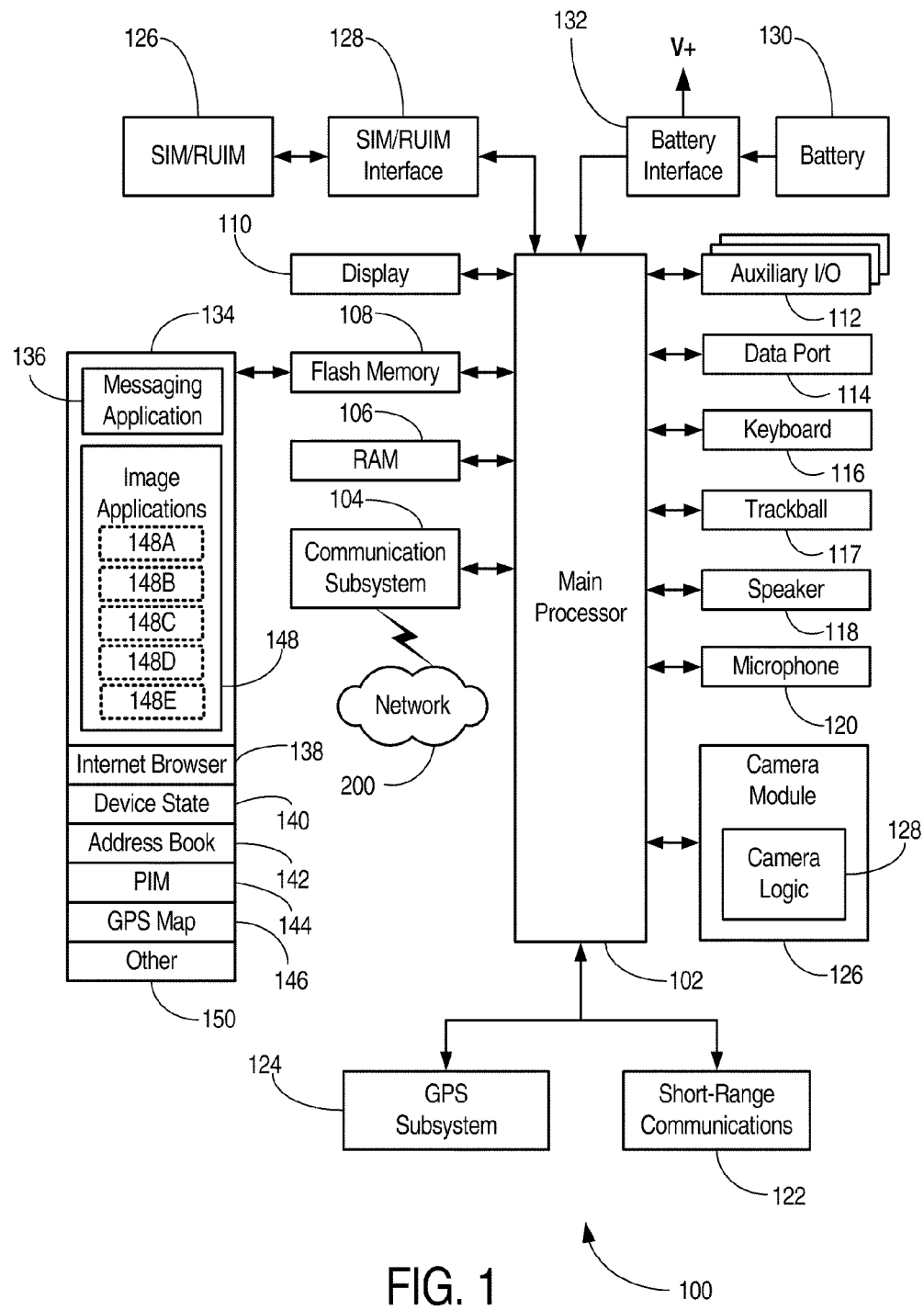
FIG. 1 is a schematic block diagram of various components that may be found in a handheld mobile communication device.

In an illustrative embodiment, the invention may be practiced with a handheld mobile communication device in a wireless operating environment. Shown in FIG. 1 is a schematic block diagram of an illustrative handheld mobile communication device 100. The communication device 100 may comprise a number of components, including a main processor 102 which controls the overall operation of communication device 100. Communication functions, including data and voice communications, may be performed through a communication subsystem 104. The communication subsystem 104 may receive messages from and send messages to a wireless network 200.

The main processor 102 may also interact with additional subsystems such as a random access memory (RAM) 106, a flash memory 108, a display 110, an auxiliary input/output (I/O) subsystem 112, a data port 114, a keyboard 116, a trackball 117, a speaker 118, a microphone 120, short-range communications 122, a GPS subsystem 124, a camera module 126, and associated camera logic 128.

Some of the subsystems of the communication device 100 may perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list. The trackball 117 may be used for various navigation functions, such as navigating through a graphical user interface (GUI) menu displayed on display 110. The trackball 117 may also be configured with a secondary actuation feature, such as allowing a user to depress the trackball, to allow selection of a highlighted item.

The GPS subsystem 124 may include a GPS antenna to receive signals transmitted by a minimum number of in-view GPS satellites required to acquire accurate latitude and longitude coordinates. The GPS system may also be operatively connected to the main processor 102 to pass the acquired latitude and longitude coordinates to one or more software applications 134, and to store the latitude and longitude coordinates as may be required into flash memory 108 or RAM 106. If the GPS antenna is not able to receive a signal from a sufficient number of in-view GPS satellites (e.g. because of buildings, bridges, or other obstructions, or because the communication device 100 is being used indoors), it may not be possible to acquire the GPS coordinates.

The camera module 126 may be adapted to capture an image through a lens onto a light sensitive image sensor such as a charge coupled device (CCD) sensor array or a complementary metal oxide semiconductor (CMOS) sensor array. The camera lens may be a fixed focus lens, or a variable focus lens with or without zoom features and controlled by camera logic 128 to focus an image onto the CCD or CMOS sensor array. The size and pixel density of the CCD or CMOS sensor array may be suitably selected for the image resolution required for a particular application. Camera logic 128 may also control the camera lens aperture and/or shutter speed by incorporating a suitable light exposure meter. Image capture using camera module 126 may initiated by a user controlling a dedicated camera shutter, or a context dependent programmable button or key (on keyboard 116, for example) that may act as a camera shutter button.

Once captured by the CCD or CMOS sensor array, the image may then be processed by camera logic 128 into a suitable digital image file format such as Joint Photographic Experts Group (JPEG), Tagged-Image File Format (TIFF), Bit Mapping (BMP), different variations on these standard image file formats, or a vendor proprietary RAW image format. The image file format may allow for the addition of image meta-data to an image file in an industry standards exchangeable image file format (EXIF), or in some vendor proprietary meta-data format.

The image file may then be stored in available device storage such as RAM 106 or flash memory 108, and displayed on display 110. As will be described in detail further below, in order to minimize consumption of potentially scarce memory resources on communications device 100, the captured image may be transmitted from communications device 100 to an Image Repository.

Still referring to FIG. 1, operating system software used by the main processor 102 is typically stored in a persistent store such as flash memory 108. Those skilled in the art will appreciate that the operating system, specific device applications, or parts thereof, may be temporarily loaded into a volatile store, such as the RAM 106, for processing by main processor 102.

The communication device 100 may send and receive communication signals over the wireless network 200 after required network registration or activation procedures have been completed. Network access may be associated with a subscriber or user of the communication device 100.

The communication device 100 may be a battery-powered device and may include a battery interface 132 for receiving one or more rechargeable batteries 130. In some embodiments, the battery 130 may be a smart battery with an embedded microprocessor. The battery interface 132 is coupled to a regulator (not shown), which assists the battery 130 in providing power V+ to the communication device 100. The battery 130 may be used to power all components and modules in the communication device 100, including the camera module 126 and associated camera logic 128.

The main processor 102, in addition to its operating system functions, enables execution of various software applications 134 on the communication device 100. A subset of software applications 134 that control basic device operations, including data and voice communication applications, will normally be installed on the communication device 100 during its manufacture.

The software applications 134 may include a messaging application 136. The messaging application 136 can be any suitable software program that allows a subscriber or user of the communication device 100 to send and receive wireless text communications. Various alternatives exist for the messaging application 136 as is well known to those skilled in the art. Messages that have been sent or received by the user are typically stored in local storage such as flash memory 108 of the communication device 100, or in some other suitable storage element in the communication device 100. In an alternative embodiment, some of the sent and received messages may be stored remotely from the communication device 100 such as in a data store of an associated host system that the communication device 100 communicates with. In an embodiment, the messaging application 136 may include a Message List user interface that is configured to allow a user to see a list of message objects (i.e. email messages) in a convenient list form. This will be described in detail further below.

The software applications 134 may also include a GPS map application 146 for providing geographic navigation, and location coordinates for geotagging objects. GPS map application 146 may be configured to operatively connect to GPS subsystem 124 to receive GPS latitude and longitude coordinates for a current position of the communication device 100. GPS map application 146 may also store scalable maps of various geographic regions in order to show the current position of communication device 100 on the map. As well, the GPS map application 146 may be configured to obtain latitude and longitude location coordinates by allowing a user to select a position on the GPS map.

Still referring to FIG. 1, communication device 100 may execute an Image Applications Module 148 that may be operatively integrated with camera module 126, camera logic 128, main processor 102, RAM 106, display 110 and various other modules and components to provide various image application functions for the images captured by the camera module 126. Image Applications Module may include various sub modules such as an Image Upload Module 148B, an Image Resizing Module 148C, a Message Integration Module 148D, and an Image Geotagging Module 148E. These various sub modules may interact with each other, and with other application modules such as the messaging application 136, Internet browser module 138, address book module 142, GPS map module 146, etc. in order to perform various functions. Image Applications Module 148 and its sub modules will be described in more detail further below.

The communication device 100 may further include a device state module 140, an address book 142, a Personal Information Manager (PIM) 144, and various other modules 150. Additional software applications may also be loaded onto the communication device 100 through at least one of the wireless network 200, the auxiliary I/O subsystem 112, the data port 114, the short-range communications subsystem 122, or other device subsystem 124.

Figure 2:
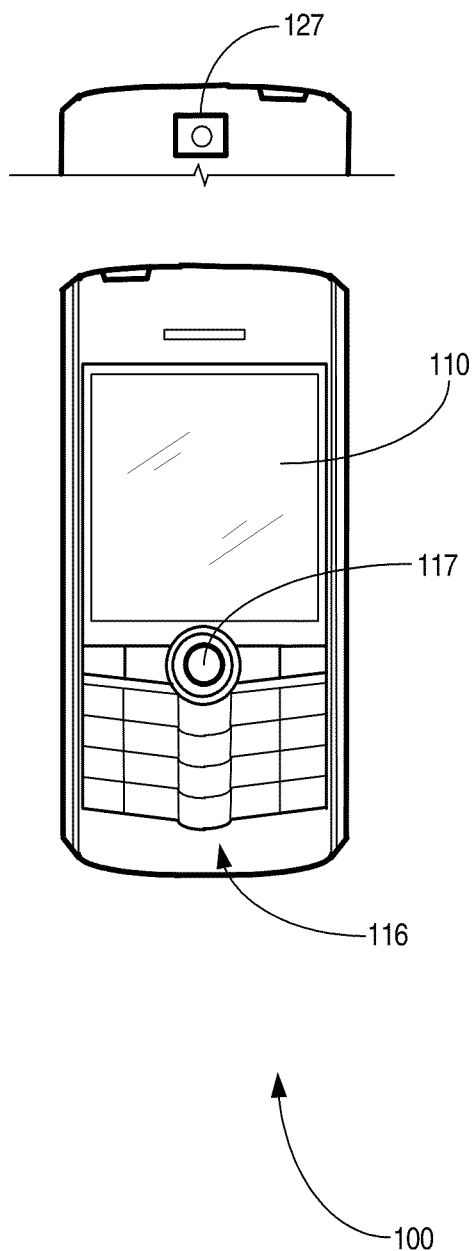
FIG. 2 is an illustrative example of a handheld mobile communication device that may provide an operating environment.

Now referring to FIG. 2, shown is an illustrative front view of a handheld mobile communication device 100 that may provide a suitable operating environment. As shown, the communication device 100 may include a display 110, a keyboard 116, and other input or navigation means such as a trackball 117. The display 110 may be configured to display various screens allowing the user of device 100 to view screen outputs from the various software applications 134, including the image applications 148. Display 110 may also be configured to provide a touch-sensitive screen input in response to a prompt or query displayed on display 110. The communication device 100 may further include a camera lens that may be used to capture an image as described above with reference to FIG. 1. In an embodiment, the integrated camera 126 may provide a camera lens 127 on the back of the communication device 100, such that a user may use the display 110 as a camera viewfinder for framing an image.

Figure 3:
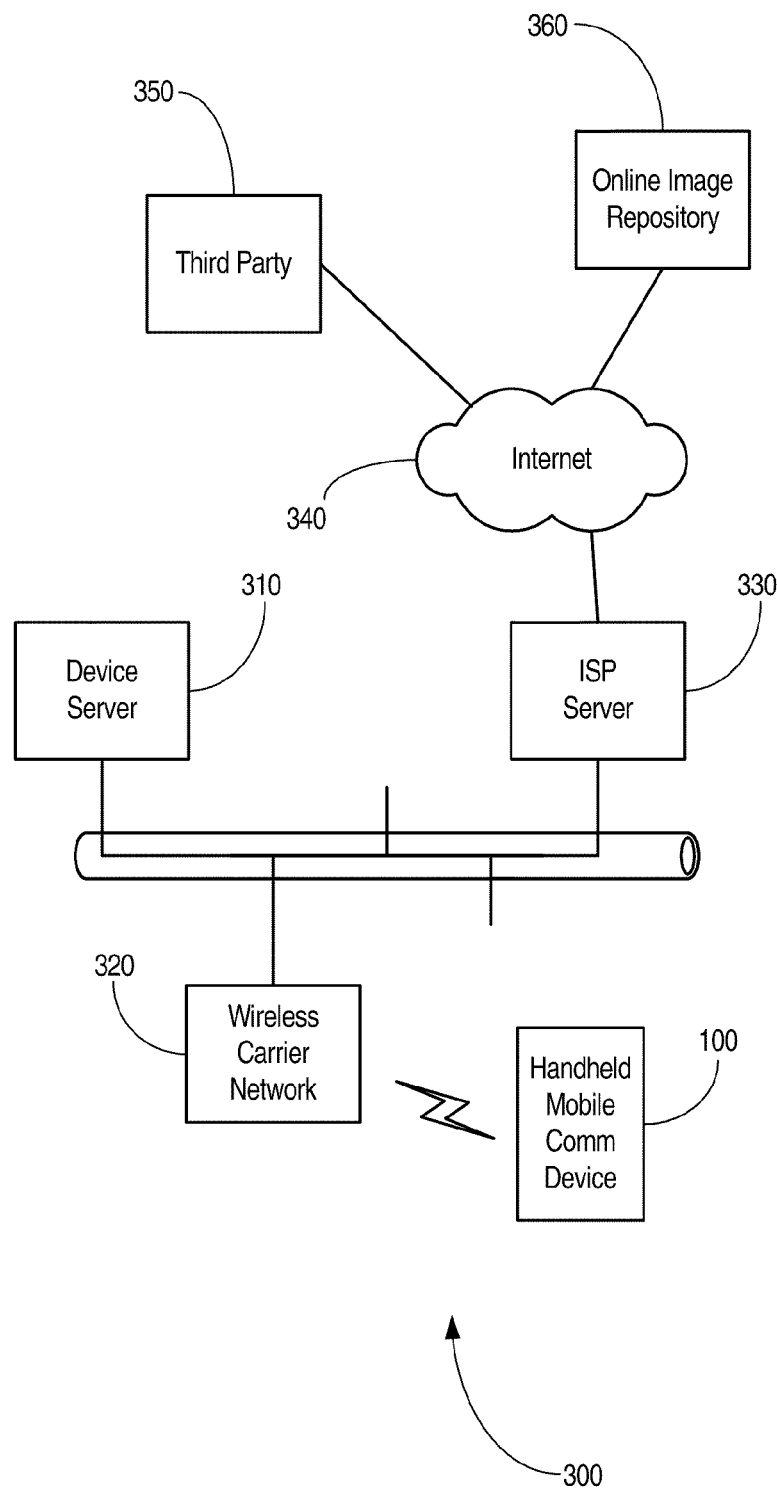
FIG. 3 is a block diagram of an illustrative example of a network environment in which various embodiments may be practiced.

Now referring to FIG. 3, shown is a schematic block diagram of an illustrative network environment 300 in which various embodiments of the invention may be practiced. As shown, network environment 300 may include a device server 310 operatively connected to the handheld mobile communication device 100 via a wireless carrier network 320. An Internet Service Provider (ISP) server 330 may also be provided in the network environment 300 such that a user of device 100 may access the Internet 340 from the device 100.

In an embodiment, the Internet 340 may provide access to an Image Repository 360. Membership to use the Image Repository 360 may be free, or may be by paid subscription, for example. The Image Repository 360 may also be accessible by a third party 350 that has membership to the Image Repository 360. As well, the Image Repository 360 may be accessed from other handheld mobile communication devices 100B within wireless carrier network 320, or from other compatible communication devices 100C with access to Internet 340.

Figure 4A:
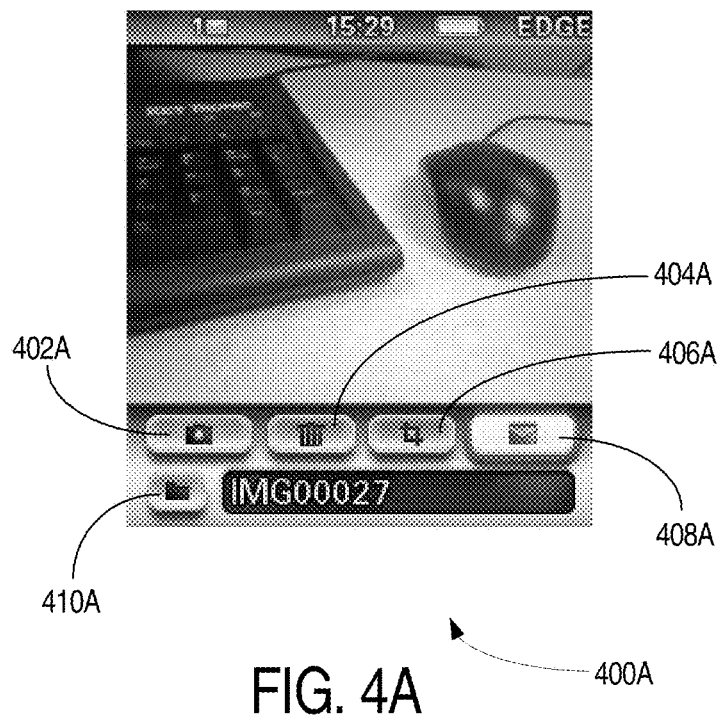
FIGS. 4A to 4K are screen captures of illustrative user interfaces in accordance with various embodiments.

Now referring to FIGS. 4A to 4K, shown are illustrative user interfaces in accordance with various embodiments. First, referring to FIG. 4A, shown is an illustrative integrated camera user interface screen 400A displaying an illustrative image "IMG00027" captured by the integrated camera (e.g. by camera module 126 and camera logic 128 as previously described). As shown, the camera user interface 400A may include icons such a "camera mode" icon 402A, a "delete image" icon 404A, a "crop image" icon 406A, a "mail image" icon 408A, and an "images folder" icon 410A.

Figure 4B:
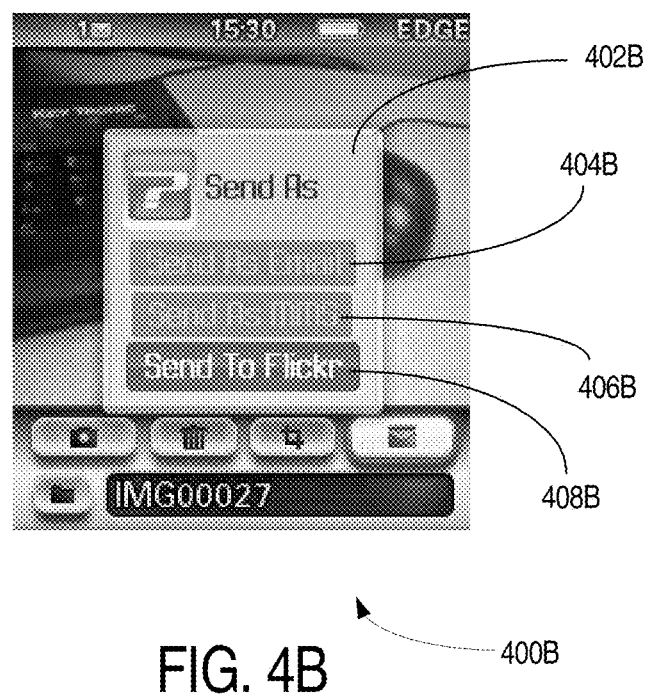

Referring to FIG. 4B, shown is a camera user interface screen 400B now including a "Send . . . " pop-up menu 402B. In this illustrative example, the "Send . . . " pop-up menu 402B includes a number of menu options including "Send as Email" 404B, "Send as MMS (Multimedia Messaging Service)" 406B, and "Send To (Image Repository)" 408B (e.g. where the Image Repository may be an online image repository such as Flickr™, for example). These "Send . . . " options will be described in more detail further below.

Figure 4C:
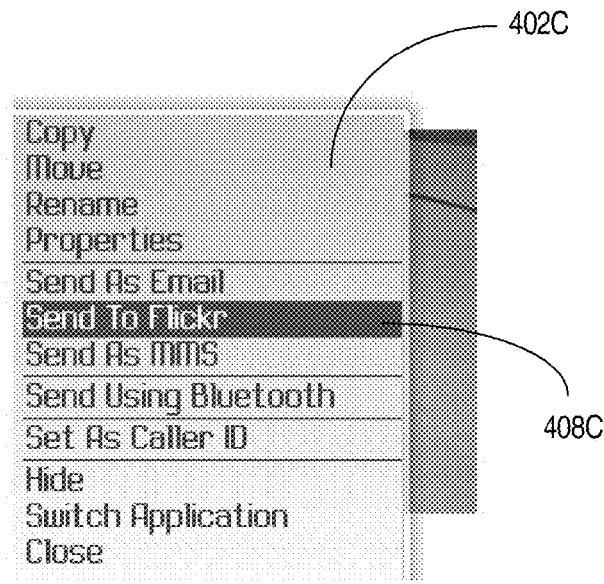

FIG. 4C shows a user interface screen 400C with a context menu 402C that may also provide the "Send . . . " menu options as described above, including "Send to (Image Repository)" 408C. This context menu 402C may be another one of several ways in which the "Send to (Image Repository)" option may be accessed, and will be discussed in more detail further below.

Figure 4D:
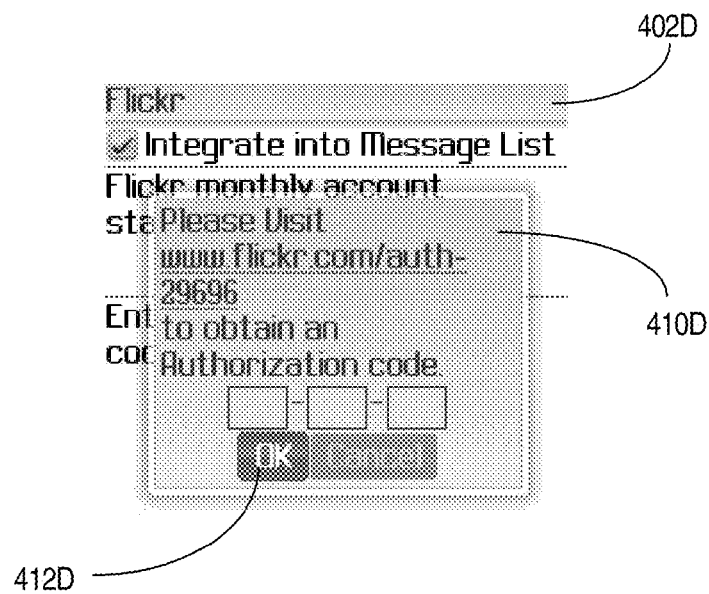

Now referring to FIG. 4D, shown is a user interface screen 400D with an option settings menu 402D for the "Send to (Image Repository)" option in which records of images uploaded to an Image Repository may be integrated into a Message List. The Message List may be a chronological listing of different types of objects that may include, for example, email messages, message status reports, telephone call records, etc. This Message List integration will be described in more detail further below.

Figure 4E:
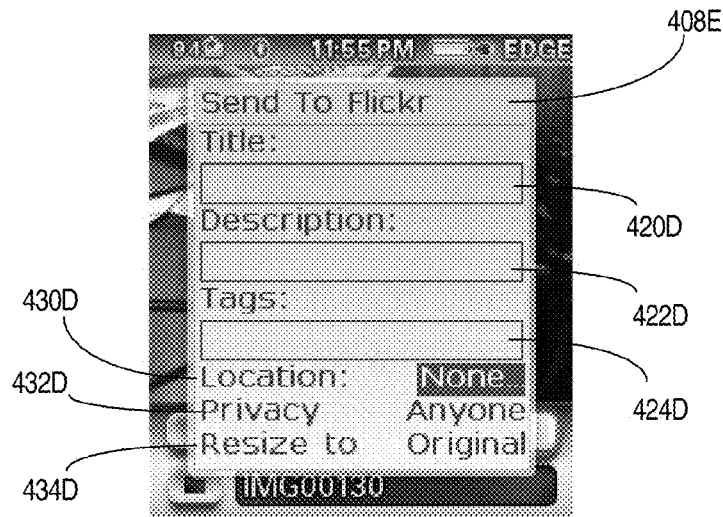

Now referring to FIG. 4E, shown is a user interface screen 400E with a "Send to (Image Repository)" window 408E in which a number of text entry fields are provided to allow the user to add descriptive information, such as "Title", "Description", and "Tags". Furthermore, the "Send to (Image Repository)" window may include various other options such as a geographic "Location" field 430D, a "Privacy" setting 432D, and an image "Resize to" setting 434D. These various settings and features will be discussed in more detail further below.

Figure 4F:
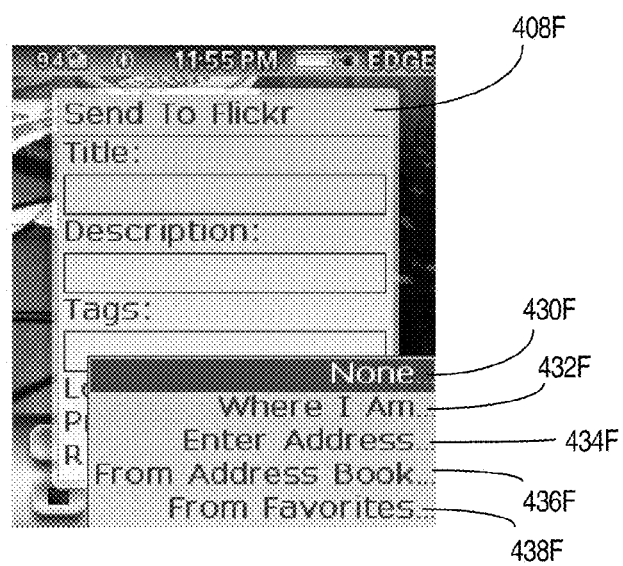

FIG. 4F shows a user interface screen 400F with an illustrative "Send to (Image Repository)" window 408F which may include various options for selecting a geographic location, such as "None" 430F, a "Where I Am . . . " option 432F, an "Enter Address . . . " option 434F, a "From Address Book . . . " option 436F, and a "Favorites" option 438F. These various options will be discussed in more detail further below.

Figure 4G:
Figure 4H:
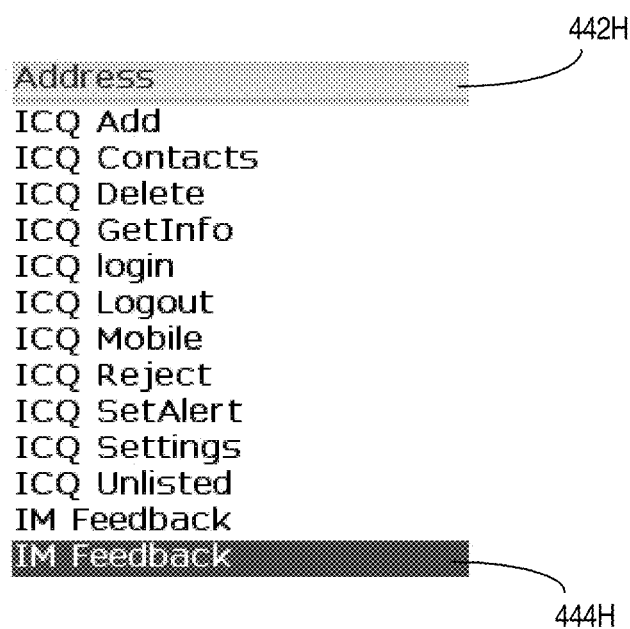

Now referring to FIG. 4G, shown is a user interface screen 400G with an illustrative "Send to (Image Repository)" screen 408G with an "Enter Address" pop-up window 440G. For example, in order to obtain geographic coordinates by address, a user may fill out one or more of the following fields: Address 442G, City 444G, State/Province 446G, and Country 448G. Alternatively, FIG. 4H shows a user interface 400H with an illustrative example of an address list 442H from which a target address 444H may be selected. With the specification of an address, or the selection of a target address from a list, the corresponding geographic coordinates may be obtained from a GPS mapping application (e.g. GPS map module 146). This feature will be described in more detail further below.

Figure 4I:
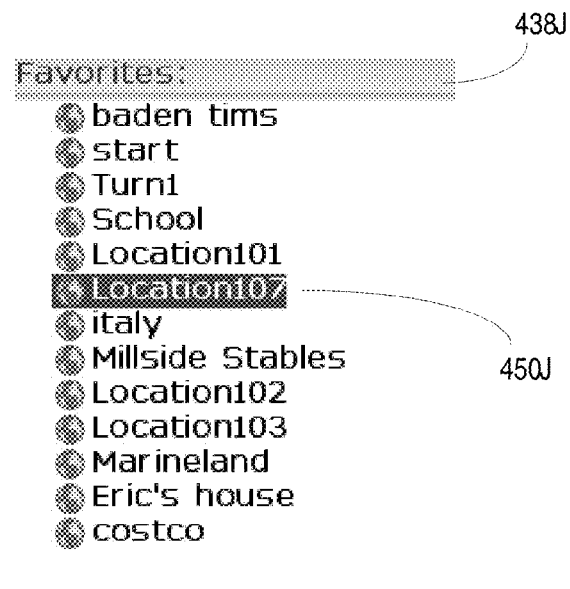
Figure 4J:
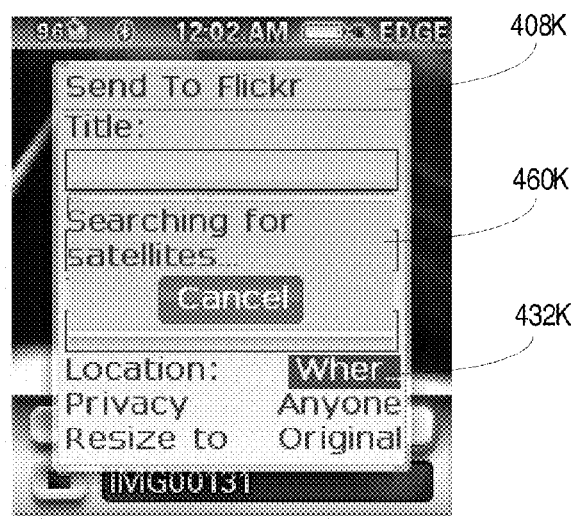

Now referring to FIG. 4I, shown is a user interface screen 400J with an illustrative list of location "Favorites" 438J from which a "favorite" location 450J may be selected for the purposes of obtaining the corresponding geographic coordinates. This feature will be described in more detail further below.

Now referring to FIG. 4I, shown is a user interface screen 400K with an illustrative "Send To (Image Repository)" screen 408K in which the "Where I Am . . . " option has been selected to obtain the geographic location. In order to determine the current location, the device 100 may search for and try to acquire GPS signals using the GPS subsystem 124, as indicated in pop-up message 460K.

Figure 4K:
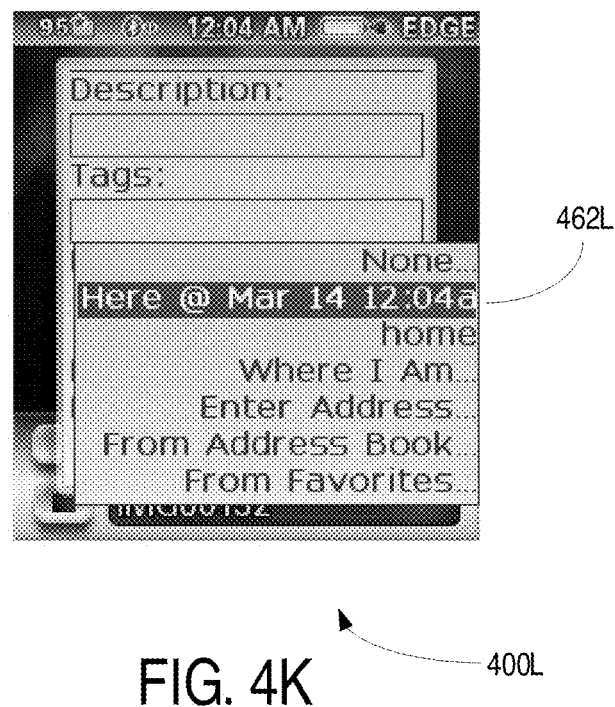

Now referring to FIG. 4K, shown is a user interface screen 400L with an illustrative geographic location menu in which a new location entry 462L (e.g. "Here @ March 14 12:04 a") has been added. The use of this geographic location acquired through the "Where I Am . . . " option will be described in more detail further below.

Now referring to FIG. 5, and referring back to FIGS. 4A to 4L as necessary, various embodiments will be described in detail.

In an embodiment, a Message Integration Module 148D may be configured to integrate records of image uploads into a main Message List that may also be used to list, for example, email communications. As will be explained, by integrating Message List image upload objects within a Message List, the Message List image upload objects may be readily shared with other users as if they were email messages, such that other users may be able to easily access the image corresponding to the Message List image upload object.

Figure 5:
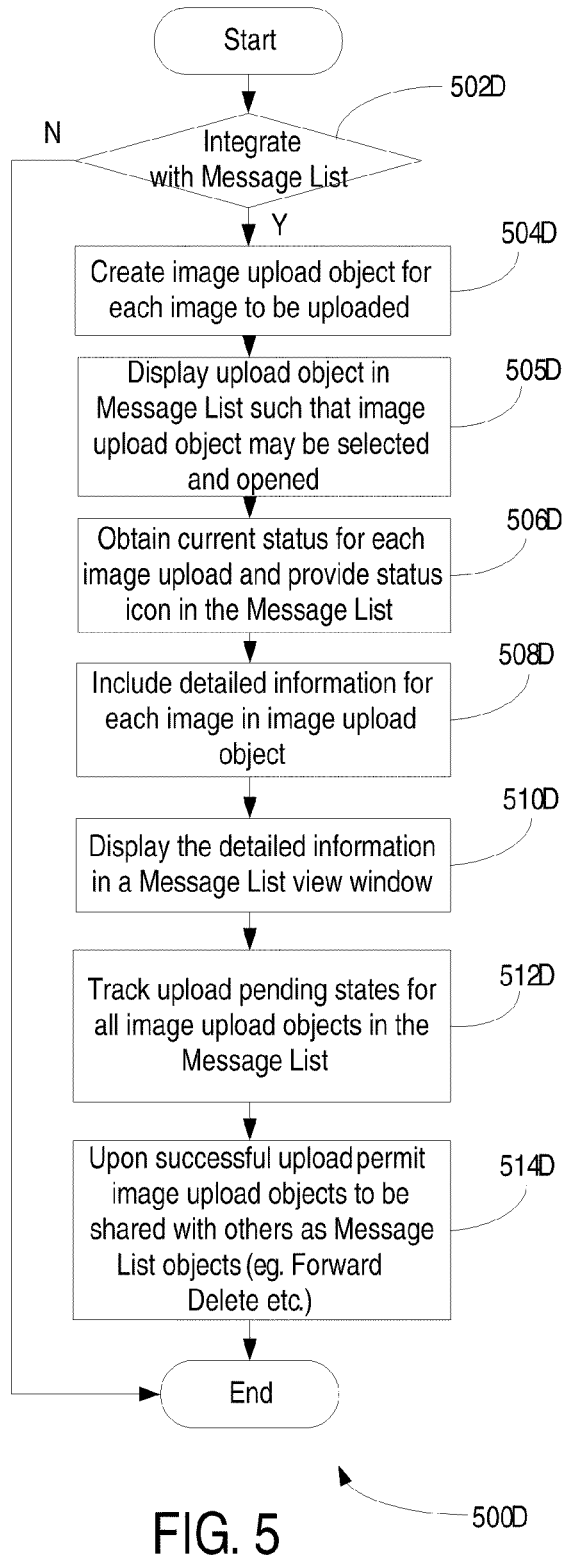
FIG. 5 is a flowchart of an illustrative method for integrating an image upload object with a message list in accordance with an embodiment.

FIG. 5 shows a flowchart of an illustrative method 500D for integrating an Message List image upload object with a Message List in accordance with an embodiment. As shown, method 500D starts and at decision block 502D determines if the user has selected to integrate the image application module 148 with the Message List. For example, an options screen may be made available where the user can specify a "Message List Integration" setting. The Message List may provide a user interface for viewing information relating to images uploaded to the Image Repository 360, and status and configuration information relating to the Image Repository 360. For example, the Message List may store Message List image upload objects containing data on image uploads, messages relating to Image Repository account usage, and changes to the Image Repository account that is associated with a communication device 100.

Thus, if the answer is yes at decision block 502D, method 500D may proceed to block 504D where method 500D may configure the Message Integration Module 148D to create an image upload object for each image being uploaded to the Image Repository, and then to block 505D where method 500D may configure the Message Integration Module 148D to display the image upload object in the Message List such that the image upload object may be selected and opened. If the answer is no at decision block 502D, method 500D ends.

In an embodiment, the Message List image upload object may be created in the Message List when the user first submits an image for upload using the Image Upload Module 140B. A view screen may be created when the user clicks on the image upload Message List object. As the image upload finishes, and a response is received from the Image Repository, the status may be changed and certain details (such as a URL link to the uploaded image) may be filled in.

As an illustrative example, each Message List object may have associated with it one or more of the following:

1) Title—The title of the window, when opened will be the Title the user entered for the photo or the filename if Title field was left blank.

2) Thumbnail image—The longest edge of the thumbnail image will be 100 pixels, for example. This may be the standard size for Image Repository thumbnails.

3) Date Uploaded.

4) File name of photo uploaded.

5) Status of Upload.

6) State (e.g. Error, Sending, Pending, Success, "Complete, with Errors"). If an Error occurred during the upload attempt, a message may be made available to describe the type of error.

7) Link to image online (A URL of the image in the Image Repository that the user can click to view, or copy to share with others.)

In an embodiment, the URL link to the uploaded image may not be displayed until a successful response containing the Image Repository photo ID is received. If an error is received, then no URL link will be available, and the user may not be able to forward the Message List image upload object in the Message List to any other person.

As an illustrative example, the URL link may be provided in the following format: http://www.Online_Image_Repository.com/photos/+USER_ID+/+PHOTO_ID. In this case, the PHOTO_ID is stored on the communication device 100, and may be visible in the image URL. The PHOTO_ID may be part of the response that is returned by the Image Repository after a successful upload.

In an embodiment, Message List image upload objects in the Message List may have an associated status icon describing the state of each image upload (e.g. Pending, Sending, Successful, or Error). The appropriate status icon may be displayed in an icon column. Thus, at block 506D, method 500D may configure Message Integration Module 148D to obtain a current status for each image upload, and provide a status icon corresponding to the current status for each Message List image upload object in the Message List. (The current status for each image upload may be obtained, for example, from the Image Upload Module 148B described earlier.) For example, after issuing an upload command, a user may continue using the communication device 100 and simply assume success of the image upload unless informed otherwise. If the user would like to check the upload status at a later time, they can do so from the Message List by looking for the status icon.

In an embodiment, the Message List image upload objects may have a "Forward . . . " menu option associated with them. This "Forward . . . " option may be available via the Message List context menu, and may be available only for image uploads that have completed successfully. The "Forward . . . " option may also be available in the full context menu when viewing an opened Message List object. Similarly, the Message List image upload objects may have other associated menu options such as "Open", "File", "Mark unopened", "Save", or "Delete", as if the image upload object was a message object. By treating the image upload object similarly to a message object, the user is likely already familiar with the user interface, and the various actions that the user may perform on the image upload objects may be more intuitive.

In an embodiment, the image upload object may mimic an email or SMS message by providing its own unique information in substitute for the regular email "Subject", "From" and body fields, as described in more detail below. This allows the upload message list object to effectively act as an email message list object, thus being able to use other built in functionality for email, without actually being one.

In an embodiment, if the user selects and opens a Message List image upload object, a text version of the upload status and additional information about the image may be displayed. Thus, at block 508D, method 500D may configure Message Integration Module 148D to include specific details in each Message List image upload object such as the image file size, description information such as Title, Description, and Tags, and the image URL link at which the uploaded image may be accessed.

In addition to the status notification icon, the image upload Message List objects may show additional information in the Message List view. For example, the "From" Field may show the user-entered Title of the uploaded photo, or if that is blank the image file name may be displayed instead. This way, some descriptive text may always be displayed in this position. As well, in the "Subject" Field, the user-entered description of the uploaded photo may be shown. If that was left blank, nothing will be shown. Thus, at block 510D, method 500D may configure Message Integration Module 148D to display the additional information in the Message List view window as described.

In an embodiment, if the user attempts to upload photos faster than they can be sent, they will be queued. They may appear in the Message List in a "Pending" state until they have started uploading. The Image Upload Module 148B may be configured such that an upload will not be started until the previous upload has completed. Thus, at block 512D, method 500D may configure Message Integration Module 148D to track upload "Pending" states for all image upload objects in the upload queue.

In an embodiment, a new menu option "Send To (Image Repository)" may be associated and available for use with all non-protected images files of supported file types. This menu option may be available in a file explorer, a file attachment service, and in other applications which provide a context menu for these types of image files. Thus, the file types may be associated with the "Send To Image Repository" menu option, and the menu option need not be hard-coded into any particular application.

In an embodiment, each image upload will add a Message List image upload object entry to the Message List. As well, an "Image Repository" folder may be made available in a "View Folders" area. The Image Repository folder may contain a list of all the image uploads that have been performed from the device. This list may be persistent over a device reset and battery pull. The Message List image upload object entries may be deleted by the user.

Thus, in an aspect of the invention, there is provided a method of integrating an image upload object with a message list, comprising: creating an image upload object for each image to be uploaded; and displaying the image upload object in a message list such that the image upload object may be selected and opened as a message.

In an embodiment, the method further comprises associating with the image upload object at least one of a text description, a thumbnail of the image, a date, and a file link to the uploaded image.

In another embodiment, the method further comprises associating with the image upload object an upload status for the image.

In another embodiment, the method further comprises associating with the image upload object a status icon indicating the upload status of the image upload object, the upload status of the image upload object being one of "sending", "pending", "success", "error", and "complete with errors".

In another embodiment, the method further comprises configuring each image upload object in the message list such that the image upload object may be opened, filed, marked unopened, saved, or deleted.

In another embodiment, the method further comprises configuring each image upload object in the message list such that the image upload object may be forwarded to another user and the associated uploaded image may be accessed by the other user via the file link.

In another embodiment, the method further comprises providing a uniform resource locator (URL) as the file link.

In another aspect of the invention, there is provided a system for integrating an image upload object with a message list, the system comprising a message integration module adapted to: create an image upload object for each image to be uploaded; and display the image upload object in a message list such that the image upload object may be selected and opened as a message.

In an embodiment, the message integration module is further adapted to associate with the image upload object at least one of a text description, a thumbnail of the image, a date, and a file link to the uploaded image.

In another embodiment, the message integration module is further adapted to associate with the image upload object an upload status for the image.

In another embodiment, the message integration module is further adapted to associate with the image upload object a status icon indicating the upload status of the image upload object, the upload status of the image upload object being one of "sending", "pending", "success", "error", and "complete with errors".

In another embodiment, the message integration module is further adapted to configure each image upload object in the message list such that the image upload object may be opened, filed, marked unopened, saved, or deleted.

In another embodiment, the message integration module is further adapted to configure each image upload object in the message list such that the image upload object may be forwarded to another user and the associated uploaded image may be accessed by the other user via the file link.

In another embodiment, the file link is a uniform resource locator (URL).

In another aspect of the invention, there is provided a data processor readable medium storing data processor code that when loaded into a device adapts the device to integrate an image upload object with a message list, the data processor readable medium comprising: code for creating an image upload object for each image to be uploaded; and code for displaying the image upload object in a message list such that the image upload object may be selected and opened as a message.

In an embodiment, the data processor readable medium further comprises code for associating with the image upload object at least one of a text description, a thumbnail of the image, a date, and a file link to the uploaded image.

In another embodiment, the data processor readable medium further comprises code for associating with the image upload object an upload status for the image.

In another embodiment, the data processor readable medium further comprises code for associating with the image upload object a status icon indicating the upload status of the image upload object, the upload status of the image upload object being one of "sending", "pending", "success", "error", and "complete with errors".

In another embodiment, the data processor readable medium further comprises code for configuring each image upload object in the message list such that the image upload object may be opened, filed, marked unopened, saved, or deleted.

In another embodiment, the data processor readable medium further comprises code for configuring each image upload object in the message list such that the image upload object may be forwarded to another user and the associated uploaded image may be accessed by the other user via the file link.

While illustrative embodiments have been described above, it will be appreciated that various changes and modifications may be made. More generally, the scope of the invention is defined by the following claims.

What is claimed is:

1. A method performed on a mobile communication device having a memory and a processor for integrating a record of an image upload with a message list, the method comprising:
   uploading an image to an online image repository;
   in response to uploading the image, receiving a response from the online image repository;
   creating a record of an image upload for the image uploaded to the online image repository based on the response from the online image repository; and
   displaying a message list which lists the record of an image upload and at least one of an email message or a telephone call record, such that the record of an image upload may be selected and opened as a message,
   wherein the record of an image upload is not an email message.

2. The method of claim 1, further comprising associating with the record of an image upload at least one of a text description, a thumbnail of the image, a date, and a file link to the uploaded image.

3. The method of claim 1, further comprising associating with the record of an image upload an upload status for the image.

4. The method of claim 3, further comprising associating with the record of an image upload a status icon indicating the upload status of the image upload.

5. The method of claim 1, further comprising configuring the record of an image upload in the message list such that the record of an image upload may be opened, filed, marked unopened, saved, or deleted.

6. The method of claim 2, further comprising providing a uniform resource locator (URL) as the file link.

7. The method of claim 1, wherein creating the record of the image upload comprises:
   creating the record of the image upload prior to the upload of the image; and
   updating the record of the image upload based on the response from the online image repository.

8. The method of claim 7, wherein updating the record of the image upload comprises changing a status associated with the image upload object.

9. The method of claim 7, wherein updating the record of the image upload comprises including a link to the uploaded image in the record of the image upload.

10. A system operable on a mobile communication device having a memory and a processor for integrating a record of an image upload with a message list, the system comprising a message integration module adapted to:
    upload an image to an online image repository;
    in response to uploading the image, receive a response from the online image repository;

create a record of an image upload for the image based on the response from the online image repository; and display a message list which lists the record of an image upload and at least one of an email message or a telephone call record, such that the record of an image upload may be selected and opened as a message, wherein the record of an image upload is not an email message.

11. The system of claim 10, wherein the message integration module is further adapted to associate with the record of an image upload at least one of a text description, a thumbnail of the image, a date, and a file link to the uploaded image.

12. The system of claim 10, wherein the message integration module is further adapted to associate with the record of an image upload an upload status for the image.

13. The system of claim 12, wherein the message integration module is further adapted to associate with the record of an image upload a status icon indicating the upload status of the image upload.

14. The system of claim 10, wherein the message integration module is further adapted to configure the record of an image upload in the message list such that the record of an image upload may be opened, filed, marked unopened, saved, or deleted.

15. The system of claim 11, wherein the file link is a uniform resource locator (URL).

16. A non-transitory data processor readable medium storing data processor code that when loaded into a mobile communication device having a memory and a processor and is executed adapts the device to integrate a record of an image upload with a message list, the non-transitory data processor readable medium comprising:

code for uploading an image to the online image repository and receiving a response from the online image repository;

code for creating a record of an image upload for the image uploaded to the online image repository based on the response from the online image repository; and code for displaying a message list which lists the record of an image upload and at least one of an email message or a telephone call record, such that the record of an image upload may be selected and opened as a message, wherein the record of an image upload is not an email message.

17. The non-transitory data processor readable medium of claim 16, further comprising code for associating with the record of an image upload at least one of a text description, a thumbnail of the image, a date, and a file link to the uploaded image.

18. The non-transitory data processor readable medium of claim 16, further comprising code for associating with the record of an image upload an upload status for the image.

19. The non-transitory data processor readable medium of claim 18, further comprising code for associating with the record of an image upload a status icon indicating the upload status of the image upload.

20. The non-transitory data processor readable medium of claim 16, further comprising code for configuring the record of an image upload in the message list such that the record of an_image upload may be opened, filed, marked unopened, saved, or deleted.

* * * * *